United States Patent [19]
Barr et al.

[11] Patent Number: 5,321,561
[45] Date of Patent: Jun. 14, 1994

[54] FORMAT FOR RECORDING DIGITAL AUDIO ONTO MAGNETIC TAPE WITH ENHANCED EDITING AND ERROR CORRECTION CAPABILITY

[75] Inventors: Keith Barr, Culver City; Alan Zak, Van Nuys; Marcus Ryle; David Brown, both of Los Angeles, all of Calif.

[73] Assignee: Alesis, Los Angeles, Calif.

[21] Appl. No.: 823,657

[22] Filed: Jan. 17, 1992

[51] Int. Cl.$^5$ .............................................. G11B 5/09
[52] U.S. Cl. ..................................................... 360/48
[58] Field of Search ...................... 360/27, 32, 40, 48; 369/47, 48, 59, 275.1, 275.3

[56] References Cited

U.S. PATENT DOCUMENTS 4,899,232  2/1990  Odaka et al. ........................... 360/32
5,148,328  9/1992  Kakuyama ............................. 360/27

Primary Examiner—Donald Hajec
Assistant Examiner—Won Tae C. Kim
Attorney, Agent, or Firm—Hecker & Harriman

[57] ABSTRACT

A method and apparatus for recording multiple channels of digital audio data onto one-half inch tape using a rotary head recorder. The tape format includes sector spaces and a write timing sector to provide reduced susceptibility to errors arising from head misalignment, provides improved punch-in and punch-out capabilities using overdub identification values recorded within each channel of audio information, and provides a unique time code word that facilitates accurate high-speed scan and search operations, as well as multiple device synchronization. Each pair of audio tracks terminates with a write timing sector that serves as an absolute location marker for the rotary head, and allows the digital audio system to determine precise head location with respect to the tape.

12 Claims, 9 Drawing Sheets

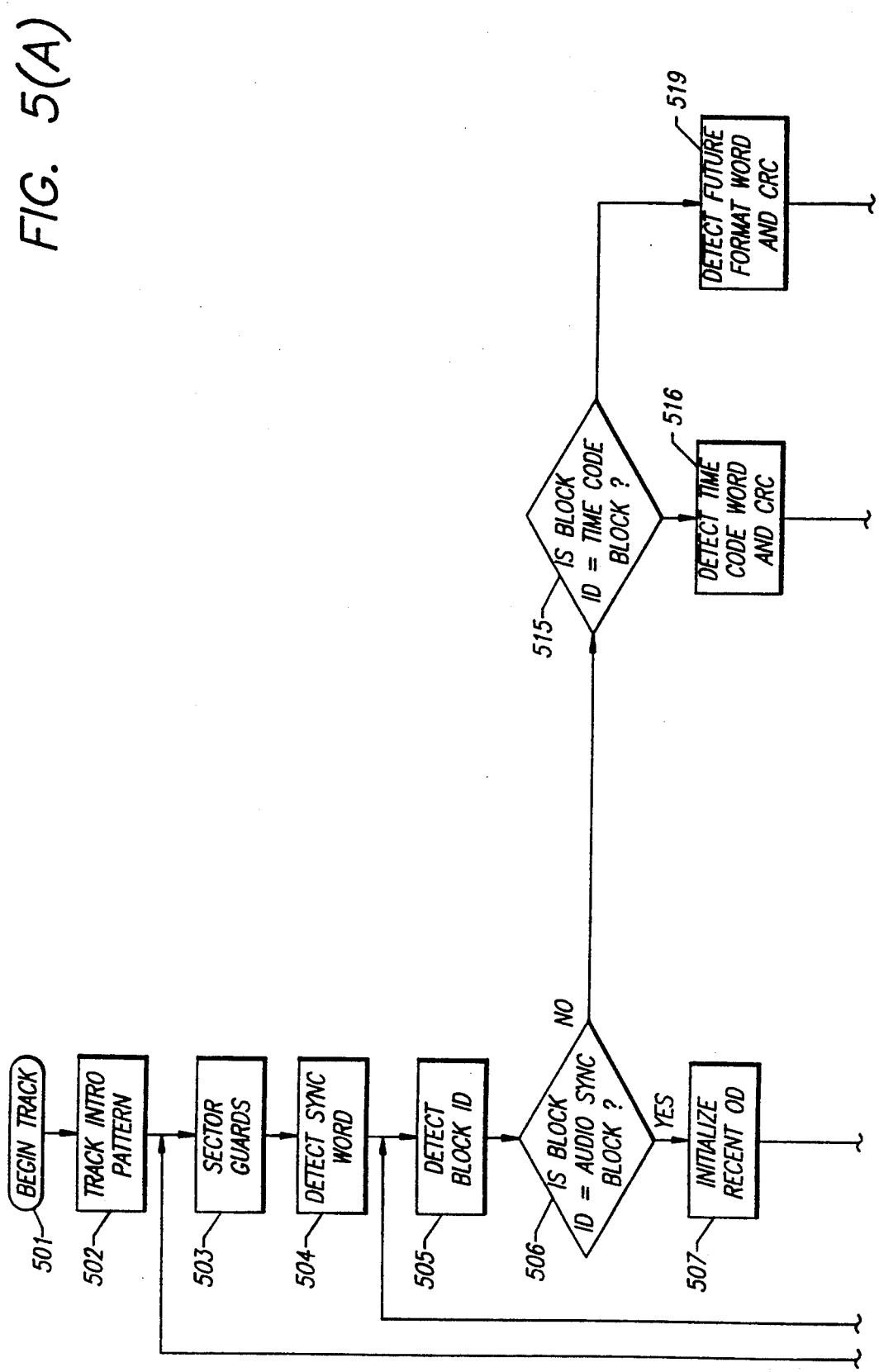

FORMAT FOR RECORDING DIGITAL AUDIO ONTO MAGNETIC TAPE WITH ENHANCED EDITING AND ERROR CORRECTION CAPABILITY

BACKGROUND OF THE PRESENT INVENTION

1. Field of the Invention

The invention relates to the field of digital audio recording and, more specifically, to a method and apparatus for recording multiple tracks of digital audio information onto magnetic tape using a rotary magnetic head, with high dropout immunity, reduced susceptibility to head misalignment and improved ability to scan at high linear tape speeds.

2. Description of the Prior Art

A full fidelity digital audio recorder requires a 1 MHz storage bandwidth per recorded audio channel. Because a rotary head digital recorder has a wide bandwidth, it is an ideal storage device for digital audio signals. Using digital procesing techniques, an audio signal is converted into a digital format and recorded onto a magnetic medium. Upon playback, the digital signal is converted first to a corrected digital audio bit stream and then to an analog waveform.

The high bandwidth required to effectively record a digital audio signal necessitates a high tape speed. Rotary head recorders achieve a high bandwidth as a result of high relative heat-to-tape speed. Media recorded using a rotary head can achieve 60,000 flux transitions/inch, about the same as stationary head recording, but track density may reach 2,000 tracks/inch, or about 10 times that of stationary head recording. Data transfer rates of 1 to 4 Mbytes/second are obtained, as the rotary head records the digital audio data onto the tape using a technique called helical scanning. In helical scanning, two or more electromagnetic heads are positioned on a head cylinder. The head cylinder is rotated at a speed (e.g., 3,000 revolutions/minute) that allows the use of a lower tape speed while still maintaining a high relative head-to-tape speed. As shown in FIG. 1, the tape is helically wrapped around a portion of the cylindrical drum.

Helical scanning records diagonally aligned tracks onto the tape. Because the tape is guided past the heads at an angle, each recorded track is placed diagonally across the tape width. FIG. 2 illustrates the diagonal tracks created by helical scanning. Each of the two heads on the cylinder alternately lays down a track 201 onto the tape 202. Each pair of tracks 203 represents a specified amount of audio signal. The tracks are recorded side by side without any space separation.

When re-recording a signal onto digital tape, the new signal is recorded over the signal previously recorded on the tape. The accumulation of debris on the tape can cause a media dropout, or recording omission, so that the new data is not properly recorded and old data is therefore not completely erased. After the re-recording operation is performed, and the debris is removed from the surface of the magnetic tape, the read head may detect old data on the track at the point where the dropout occurred. It is difficult to detect, using standard detection means, such an erasing or recording omission. When the new data is reproduced along with the old data in a digital audio system, abnormal sounds may be generated due to the unerased old data.

In professional digital audio applications, in addition to being able to record several channels on a single tape, it is often desirable to be able to selectively re-record individual channels. For example, a guitarist, after reviewing a studio session recorded with other musicians, may want to re-record a portion of his guitar solo, while leaving the rest of the recording unaltered. Additionally, possibly because he is no longer at the original studio, the guitarist may want to re-record using a different digital audio recorder than was originally used. Selectively re-recording a portion of a single channel (called "punching-in") is difficult because of the high density of data recorded using a rotary head, and because some dissimilarities in head alignment may exist between the two machines. If the new guitar solo is not precisely re-recorded over every group of bits of the old solo on the tape, the digial audio system is not able to differentiate between the old and new data on the tape. Consequently, during playback, the listener will hear portions of the old solo mixed with portions of the new solo.

During normal operation, the rotary head detects all of the information stored on the magnetic tape. However, in a high-speed scan, or "shuttle" mode, the linear tape speed is increased while the rotational speed of the rotary head is kept constant. It is desirable to record the digital information onto the magnetic tape so that the digital audio system can accurately locate and monitor specific audio portions of the tape during both normal and shuttle operation. For example, such a tape format is particularly suited to synchronizing applications, where one or more slave recorders are synchronized with a master recorder, and the slave and master tapes are operated with a precise timing relationship to one another at both normal operating speeds and higher scanning speeds. For an example of one possible synchronizing system, see the invention described in co-pending U.S. application Ser. No. 07/822,464, entitled "Method For Synchronizing Digital Audio Tape Recorders," filed Jan. 17, 1992, and assigned to the Assignee of the present invention.

Disadvantages of rotary head designs arise mainly in professional applications. Razor blade editing is not possible with a rotary head data track as it is with a stationary head recorder. Therefore, rotary head designs require electronic editing. Expensive and complex digital audio editors are required to perform electronic editing in the prior art. Another disadvantage of rotary head design stems from the multiplexing of channels: it is difficult to record and replay separate channels simultaneously. Similarly, punch-in/out is not readily feasible. Punch in/out describes a procedure whereby as a channel is played back it is placed in the record mode at a certain point in the music to record new material, then taken out of the record mode at the end of the new passage to be recorded.

Rotary head designs are used for some 2-track professional applications. Nevertheless, professional audio applications that require electronic editing and multi-track and synchronous recording capabilities have typically retained the stationary head design for digital audio recording.

One rotary head transport system optimized for digital audio is the Digital Audio Tape (DAT) cassette format. The standard DAT system uses tape that is 3.81 mm wide capable of recording up to two hours of 2 channel digital audio onto a single cassette. The DAT system also supports 4 channel recording of 12-bit nonlinear quantized audio data using a 32 kHz sampling rate.

One prior art digital audio rotary head system is capable of recording 12 tracks of digital audio onto a specially designed 8 mm cassette. Because of the relatively small tape width, however, the prior art system's high bit density renders it highly susceptible to errors due to media dropouts. Further, the system is only capable of recording approximately 15 minutes of digital audio information per cassette.

Tape cassettes that contain 8 mm wide tape are of fairly good quality and are generally available, but cannot accommodate many tracks without a significant decrease in total playing time. The same holds true for the 3.81 mm R-DAT tape. One-half inch wide tape is superior in that it is widely available and can accommodate multiple channels of digital audio without sacrificing playing time.

The use of a rotary head design for digital audio recorders offers the opportunity to achieve the high bandwidth required for digital audio storage. The narrow track width and high tape-to-head speed of rotary head designs yield high recording density and low tape consumption. A digital audio tape format for use with one-half inch tape is an attractive alternative to prior art systems that use 8 mm or R-DAT (3.81 mm) tape. One-half inch tape is wider, allowing more data to be recorded per linear inch without increasing dropout susceptibility. Further, standard one-half inch cassettes provide longer playing times than standard 8 mm or R-DAT tapes. Also, mass production of one-half inch tape allows it to be manufactured at low cost, making a relatively sophisticated storage medium available to both consumers and professionals. It is therefore desirable to design a tape format that can be used to record multiple channels of digital audio information on one-half inch tape.

SUMMARY OF THE INVENTION

The invention provides a method and apparatus for recording multiple channels of digital audio data onto one-half inch tape using a rotary head recorder. The tape format of the present invention includes sector spaces and a write timing sector to provide reduced susceptibility to errors arising from head misalignment. Further, the present invention provides improved punch-in and punch-out capabilities using overdub identification values recorded within each channel of audio information. Finally, the present invention provides a tape format that allows high-speed monitoring of the tape.

In one embodiment of the present invention, the tape format records eight channels of 16-bit audio data onto one-half inch tape. Each channel is divided into even and odd audio samples and divided between two helical tracks onto the tape. The data, divided into even and odd samples, is comprised of sector guards, sync blocks, redundancy information, and a time code block. Each sync block contains, in addition to a plurality of data words and error correction redundancy information, an overdub ID word that facilities "punch in" and "punch out" recording operations.

Each half channel of audio information is followed by a formatted sector space. Together with the sector guards, the sector space helps prevent errors due to head misalignment. Each half channel is assigned a unique time code word that facilitates accurate high-speed scan and search operations, as well as multiple device synchronization.

In the preferred embodiment, each pair of the written head scan tricks contains a write timing sector that serves as an absolute location marker for the rotary head, and allows the digital audio system to determine precise head location with respect to the tape.

BRIEF DESCRIPTION OF THE DRAWINGS

FIG. 5(A)–5(B) is a flowchart illustrating how a single track of digital information is processed using the preferred embodiment of the present invention.

DETAILED DESCRIPTION OF THE PREFERRED EMBODIMENT

A method and apparatus for recording multiple channels of digital audio data onto one-half inch tape using a rotary head is described. In the following description, numerous specific details, such as number of channels, number of sync blocks, etc., are described in detail to provide a more thorough description of the present invention. It will be apparent, however, to one skilled in the art, that the present invention may be practiced without these specific details. In other instances, well-known features have not been described in detail so as to not obscure the present invention.

Figure 2:
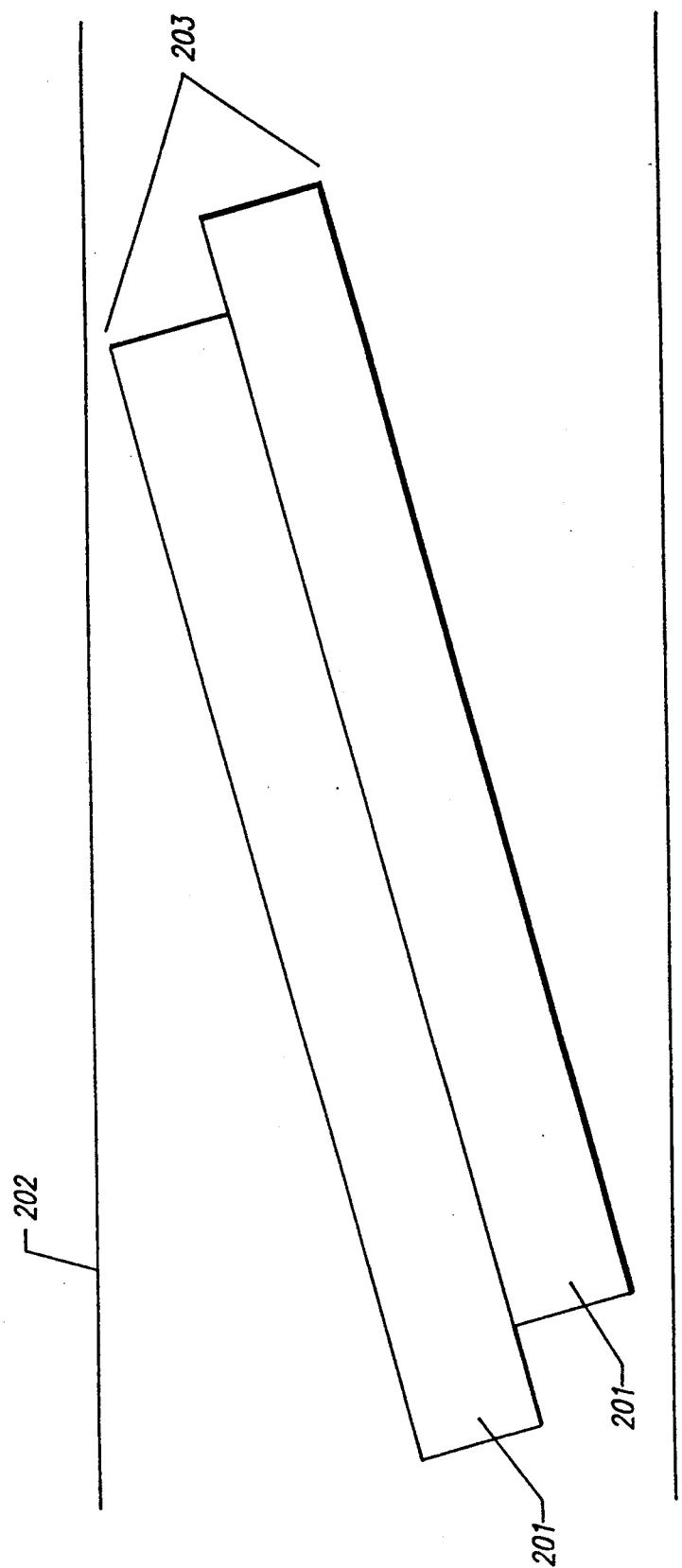
FIG. 2 illustrates the helical scanning tracks created by a rotary magnetic recording head.

The preferred embodiment of the invention is directed towards a tape format for recording 8 tracks of digital audio information onto a one-half inch tape using a rotary recording head. In a rotary head digital audio tape recording process, the audio data is sampled and rotating write heads record data on the tape in helical diagonal "tracks" across the surface of the tape. Each track is a single diagonal strip across the surface of the tape representing one-half revolution of the rotary head. As shown in FIG. 2, each revolution of the rotating head makes two diagonal tracks 201 onto the tape 202. This pair of diagonal tracks is called a frame 203 and, in the preferred embodiment, represents 20 msec of audio data.

Figure 1:
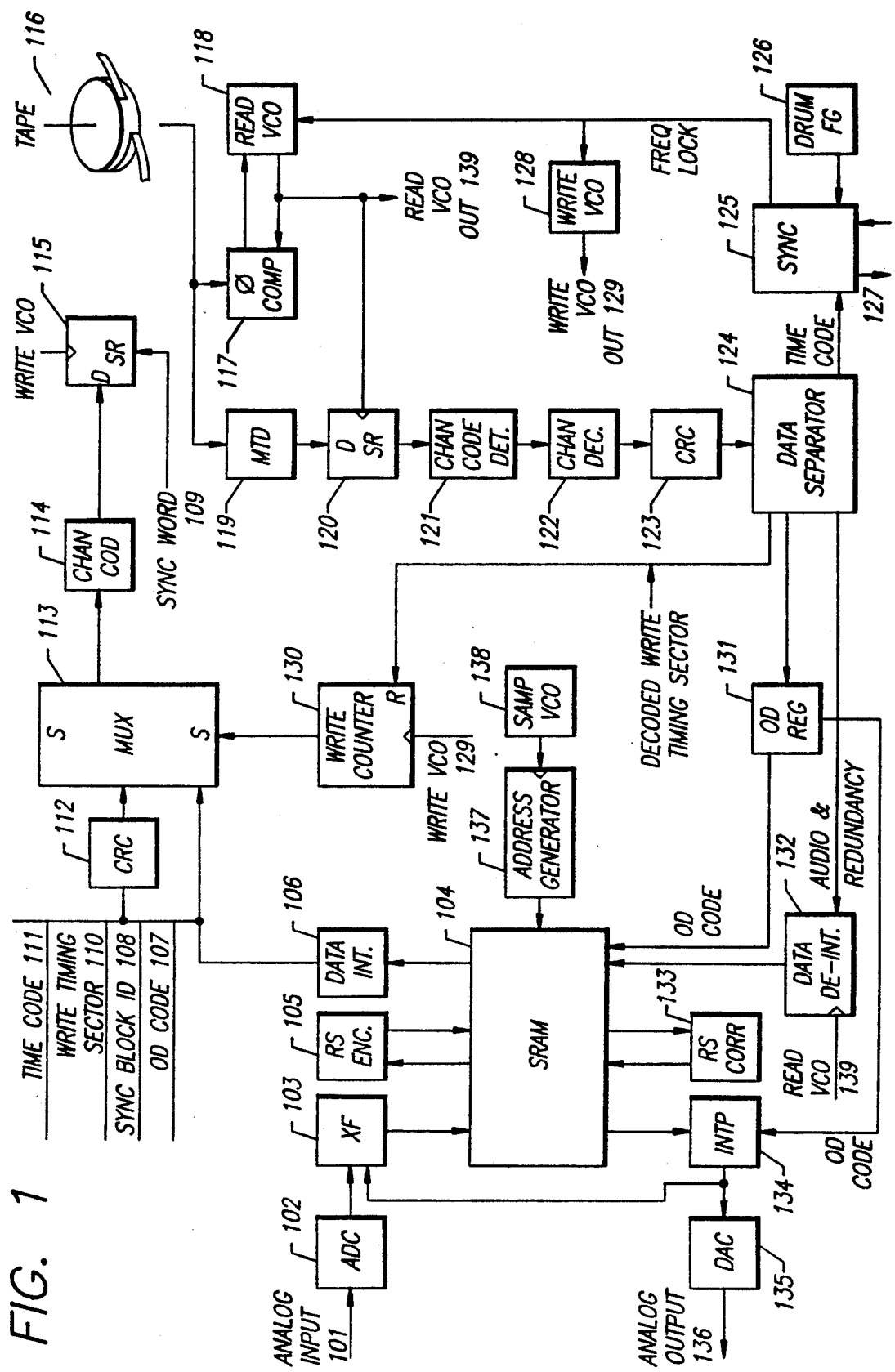
FIG. 1 is a block diagram of a digital audio recording system that may be used in conjunction with the preferred embodiment of the present invention.

A block diagram of a rotary magnetic head digital audio recording system that may be used in conjunction with the preferred embodiment of the present invention is illustrated in FIG. 1. To record a digital audio signal onto the magnetic tape, the analog audio signal 101 is sampled and quantized using analog-to-digital conversion system 102, where it is converted to digital audio samples. Alternatively, direct digital input 103 may be taken from a digital interface. The digital samples are fed into SRAM 104 through cross-fader 103. Cross-fader 103 receives and cross-fades information from interpolator 134 during "punch in/out" editing. Reed-Solomon encoder 105 retrieves the data stored in SRAM 104, supplies additional bits designed to protect the data against errors, and returns it to SRAM 104. SRAM 104 is coupled to address generator 137, which is clocked by sample VCO 138. The incoming samples are interleaved by data interleaver 106 to reduce the effects of burst errors on subsequent replay and error correction. Data interleaver 106 retrieves the data from SRAM 104 and feeds it into MUX 113 as well as CRC block 112. Reading the memory at a higher rate than it is written performs time compression.

CRC block 112 takes as input the interleaved data samples from block 106, overdub code 107, sync block ID 108, write timing sector 110, and time code 111. The output of CRC block 112 is coupled to MUX 113, and is comprised of CRC protection based on the inputs to CRC block 112. MUX 113 transmits CRC protection, interleaved data samples, overdub code 107, sync block ID 108, write timing sector 110, or time code 111 to channel coder 114, based on the output of write counter 130. Write counter 130 controls the formatting of the magnetic tape. The blocks are then converted into a channel code by channel coder 114, which combines the data with clock information. Channel coder 114 modulates the signal from 8 to 10 bit words so as to have a minimum DC content, and is coupled to shift register 115 along with sync word 109. Shift register 115 is clocked by write VCO 128, and provides an encoded digital audio data signal to to the rotary heads 116 via a rotary transformer to make the binary recording, which leaves the tape track with a pattern of transistions.

In the preferred embodiment, the rotary drum turns at 3000 revolutions/minute, so one revolution takes 20 msec. Thus, each frame recorded on the tape contains 20 msec of audio data. In order to record, for example, a 48 kHz sample rate per channel, 960 samples must be stored for each channel.

Upon playback, the transitions on the tape track induce pulses in the read head, which are used to re-create the recorded waveform. This detected signal is fed to phase comparator 117 and to multiple transition detector 119. Phase comparator is coupled to read VCO 118, and provides phase information, based on the transition information detected on the tape, that controls the phase of read VCO 118. The read VCO output 139 is coupled to a 10 bit shift register 120 and to de-interleave block 132. Multiple transition detector 119 is coupled to shift register 120.

Shift register 120 is coupled to channel code detector 121. Channel code detector determines the validity of each 10 bit word received from shift register 120. Channel code detector 121 is coupled to channel code demodulator 122, which demodulates the data stream from 10 bit words to 8 . bit words. These 8 bit words are fed to CRC error detection block 123, and then into data separator 124.

Data separator 124 determines the nature of the digital data, and provides this decoded information to the rest of the read circuitry. Data separator 124 separates the time code 111 and provides this to sync block 125. Sync block 125 is also coupled to drum frequency generator 126. Sync block 125 receives and transmits time code information through time code port 127, and controls synching operations among multiple digital audio recorders. Drum frequency generator 126 provides a 1200 Hz pulse to sync block 125 that is generated by rotating drum 116. Sync block 125 provides a frequency lock signal to both write VCO 128 and read VCO 118. Of course, read VCO 118 still must be phase locked using phase comparator 117.

Data separator 124 provides decoded write timing sector signal 110 to the reset input of write counter 130. Write counter 130, clocked by write VCO output 129, is reset after every occurrence of the write timing sector, that is, after every drum revolution.

Data separator 124 provides decoded overdub code 107 to SRAM 104 through overdub register 131. Overdub register 131 keeps track of the most recent overdub code detected in each audio channel. Data separator 124 provides audio and redundancy (digital audio samples, sync block ID's, Reed-Solomon redundancy) to de-interleave block 132 where, in addition to time-expanding the recording, functions to remove any wow and flutter due to head-to-tape speed variations. De-interleave block 132 provides the digital information to SRAM 104 in its proper order, and is clocked by read VCO output 139. Reed-Solomon correction block 133 retrieves the stored digital information, corrects it, if necessary, and returns it to storage. Interpolator 134 retrieves the corrected information from SRAM 104, and provides it to cross-fader 103 and digital-to-analog converter 135. Interpolator 134 is also coupled to overdub register 131. The reproduced analog audio output 136 is outputted from DAC block 135. Alternatively, the digital recording may be transmitted to another digital device via an interconnection between the machines in the digital domain.

The present invention describes a tape format that permits the recording and overdubbing of digital audio information onto one-half inch tape. Although one-half inch tape is described in conjunction with the present invention, it will be apparent to those skilled in the art that any suitable medium may be used. For example, the present invention may be used with tape of any width. Further, the present invention may be used to record any number of channels of digital audio by adjusting the size and number of audio sectors, sync blocks, data words, as well as the tape and rotary head speeds, in the spirit of the invention.

In the preferred embodiment of the present invention, the read head and the write head are not identically sized. Instead, the read head is approximately ⅔ the dimensions of the write head. Because substantially no space is left between adjacent tracks on the tape, the smaller read head introduces some head misalignment forgiveness into the system.

In the preferred embodiment, 20 msec of audio information is encoded on two tracks, or one revolution of the rotary head. The audio information is sampled using commonly known sampling techniques. The samples are divided into even and odd samples for each channel. These samples, as even and odd groups, are separately recorded on the two tracks so as to provide greater resistance to errors caused by head clogging or linear tape deformations. Interleaved in this manner, the system can interpolate between known, good samples based on the digital audio data received and provide an essentially error free response.

Figure 3:
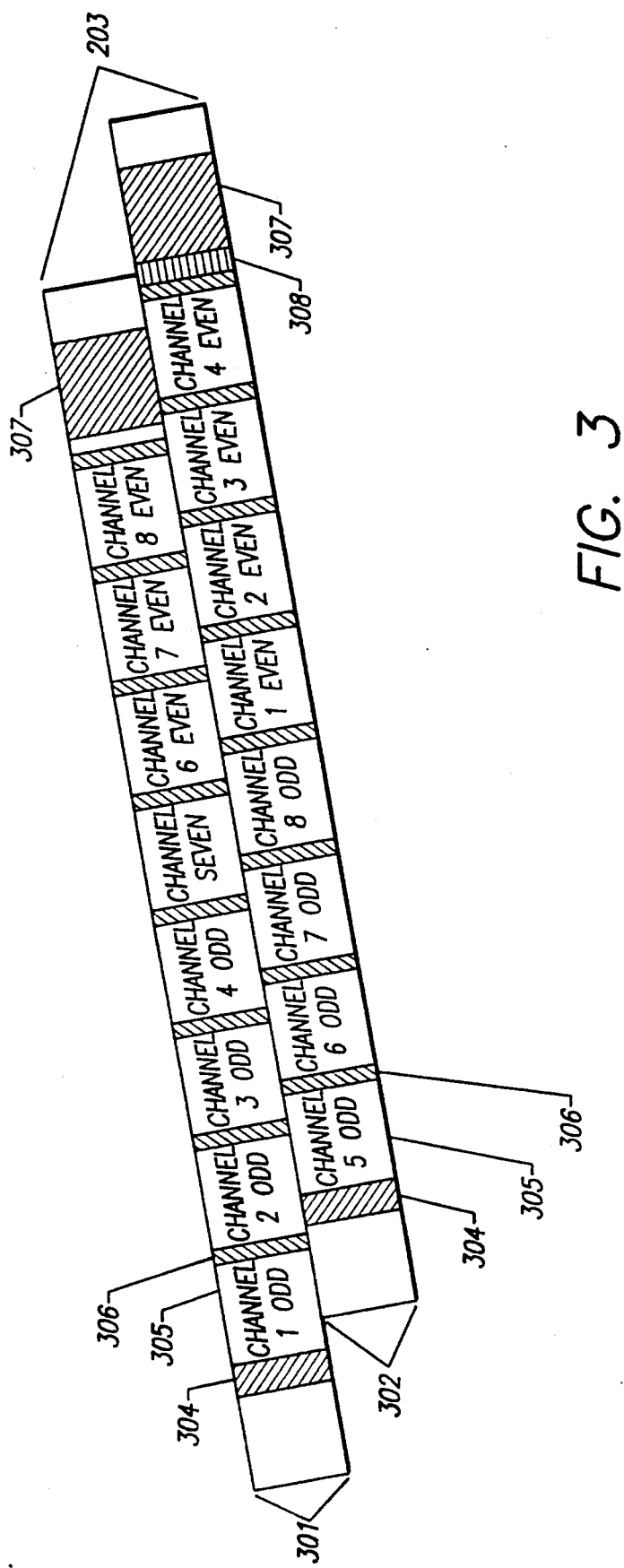
FIG. 3 illustrates as interleave scheme used in conjunction with the preferred embodiment of the present invention.

In the preferred embodiment, the even and odd samples for each of the eight channels of audio samples are interleaved as illustrated in FIG. 3. The odd samples for channels 1–4 followed by the even samples for channels 5–8 are recorded in one track 301, and the odd samples of channels 5–8 followed by the even samples for channels 1–4 are recorded on the other track 302 of the same frame 203.

Interleaving the data samples allows uncorrectable errors to be concealed by interpolation. In the event of a clogged head, the missing samples can be interpolated from the remaining samples.

In the preferred embodiment, each track (301 or 302) is comprised of a track intro 304, eight audio sectors 305, sector spaces 306 between each audio sector 305, a write timing sector 308, and a track exit 307.

In the preferred embodiment, to assure that the data bits have sufficient transitions to support synchronization, all of the digital information in the tape format is modulated using an 8-10 channel coding scheme prior to being recorded onto the tape. The 8-10 scheme maps each 8 bits of digital data to a unique 10 bit word. Channel coding helps facilitate error detection on playback. The channel coding scheme takes 8 bits of data and recodes it into 10 bits of code with sufficient transitions to enable synchronization. The DC components are sufficiently limited to allow the use of a rotary head transformer in conveying write data to the write heads. To accurately recover data from the tape, the tape format must provide sufficient transitions to the data separator to keep the system synchronized. In the invention, 8 bits of data are converted to 10 bits to insure a large number of transitions, or 1's, in the data stream. In the 8-10 scheme used in the preferred embodiment of the present invention, the maximum number of consecutive zeros is two and the minimum number of consecutive zeros is none.

Further, although the present invention may be used to format digital data encoded using any format, the preferred embodiment encodes the analog signal into digital information using the Non-Return-To-Zero-Inverted (NRZI) encoding scheme. In NRZI, a digital "one" is encoded as a transition from either a high logic level to a low logic level, or from a low logic level to a high logic level. A digital "zero" is encoded as the absence of a transition. Thus, the binary word "1101" is encoded as "transition-transition-no transition-transition."

Figure 4A:
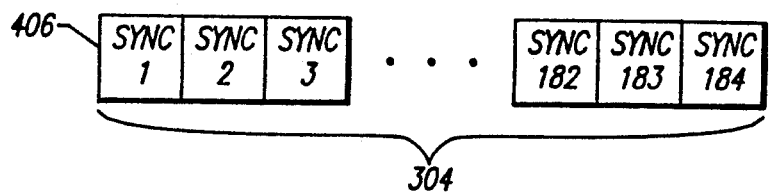
FIGS. 4(A)–4(I) illustrate the tape format of the preferred embodiment of the present invention.

The tape format of the preferred embodiment is now described. FIGS. 4(A) through 4(I), along with FIG. 3, illustrate the tape format of one embodiment of the present invention. Two tracks of 8 channel data are recorded during a single revolution of the recording head. The track intro 304 is comprised of 184 sync words 406, as illustrated in FIG. 4(A). After channel coding, each sync word 406 consists of nine 1's followed by a single zero. The track intro 304 is read by the read logic prior to the first audio sector 305 of audio samples. Phase-lock of the read VCO 118 is required to insure data reliability upon playback. The nine 1's provide additional transitions to the read logic to help it maintain phase-lock.

Figure 4B:
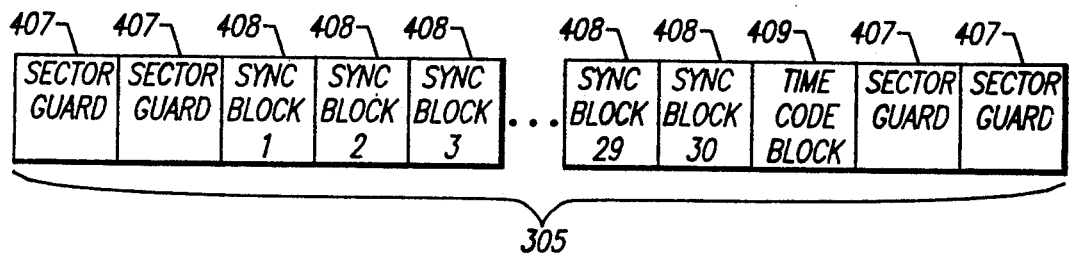
Figure 4C:
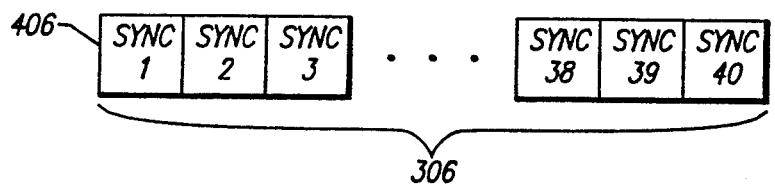

As described above, each of the eight channels, or audio sectors 305, of digital audio information is broken up into "even" and "odd" audio sectors 305, and interleaved between the two tracks as shown in FIG. 3. An audio sector 305 is the basic recording unit of the present invention. As shown in FIG. 4(B), each audio sector 305 is comprised of sector guards 407, sync blocks 408 of audio samples and correction redundancy, and a time code block 409. Each audio sector 305 is separated from a neighboring audio sector 305 by a sector space 306.

Each audio sector 305 begins with two blocks of sync words 406 called sector guards 407. Each sector guard 407 consists of forty sync words 406, as illustrated in FIG. 4(F). As described above, these sync words 406 are comprised of nine 1's followed by a single zero. The sector guards 407 help the read logic maintain phase-lock, and also introduce some head misalignment forgiveness into the system during "punch in/out" operations. In fact, the sector guards 407 help to cover up old data, allowing a head-tape misalignment margin of up to 3 sync blocks 408.

After the two sector guards 407, the audio samples and correction redundancy are recorded. The audio samples are divided among 30 sync blocks 408. In the preferred embodiment, each sync block 408 consists of 376 bits. As shown in FIG. 4(G) sync block 408 is comprised of an 8-bit sync word 406, an 8-bit sync block ID 414, a plurality of 16-bit data words 416 (comprised of audio samples and Reed-Solomon redundancy), and some redundant error correction data, such as an 8-bit overdub ID 415 and a 32-bit CRC word 417. The sync word 406 is as described above and provides clock information to the read logic. After 8-10 channel coding, each sync block 408 contains 470 channel clocks.

The sync block ID 414 identifies the particular sync block. The lower 5 bits of the sync block ID 414 are used to identify whether a sync block 408, time code block 409 or write timing block 418 is recorded. These 5 bits are set equal to 0-29 for the 30 sync blocks 408 within each audio sector 305, to 30 for the time code block 409, and to 31 for the write timing block 418. The upper 3 bits of the sync block ID 414 represent the particular audio sector 305, numbered from 0 to 7 on each track.

After the sync block ID 414 is an overdub ID 415, used as part of the error detection mechanism. The overdub ID 415 is an 8-bit value that is assigned to a sync block 408 every time data is written to an audio sector 305. Each time a track or channel of information is overwritten, the overdub ID 415 is detected, incremented and rewritten. Thus, if a channel (audio sector 305) is re-recorded, the overdub ID 415 of each sync block 408 within that channel is read, incremented and then re-recorded back with the new sync block information. When playing back an audio sector 305, the read logic looks at each overdub ID 415 contained in all 30 sync blocks 408 of the audio sector 305, and accepts as valid only those sync blocks 408 with the most recent overdub ID 415. For example, if after reading back an audio sector 305, 26 sync blocks contain an overdub ID of "00001101" and 4 sync blocks contain an overdub ID equal to "00001100", the latter 4 sync blocks 408 are corrected for playback. Unlike the prior art, the present invention can accurately play back the tape even if old information from a previous recording is not completely overwritten. The present invention avoids artifacts by correcting (if possible) the old sync block 408 associated with the older overdub ID 415.

After the overdub ID 415 comes 20 data words 416. Each data word 416 consists of 16 bits of sampled digital audio information and Reed-Solomon redundancy that has been modulated using an 8-10 encoding scheme so that each data word 416 consists of 20 channel clocks. After the 20th data word is a 32 bit CRC word 417 used to check the correctness of the received data words 416. The CRC word 417 provides some redundancy that allows errors to be detected and subsequently corrected.

Figure 4D:
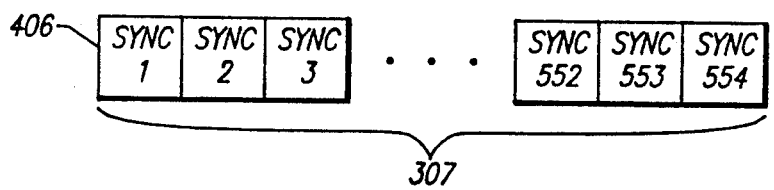
Figure 4E:
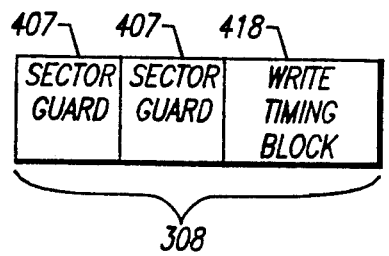
Figure 4F:
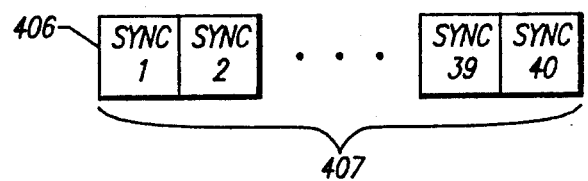
Figure 4G:
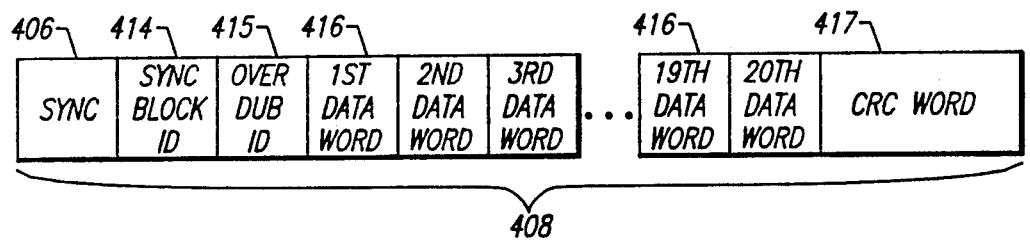
Figure 4H:
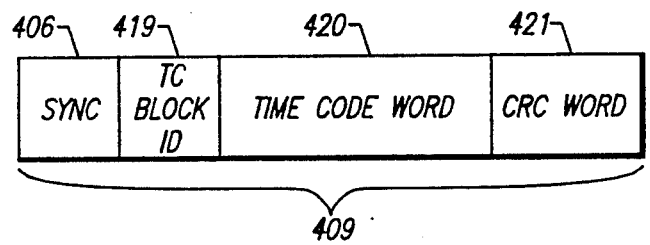

After the 30th sync block 408 in the audio sector 305, a time code block 409 is recorded, shown in FIG. 4(H). Each time code block 409 is comprised of an 8-bit sync word 406, an 8-bit time code block ID 419, a 32-bit time code word 420, and another 32-bit CRC check word 421. The sync word 406 and CRC check word 421 are as described above. The lower 5 bits of the time clock block ID 419 are set equal to 30 to indicate that the 32-bit word is time code information and not digital audio data. The upper 3 bits of the time code block ID 419 represent the audio sector 305 that the time code block 409 is associated with, numbered from 0 to 7.

The recorded time code word 420 is incremented (by the number of audio samples each rotation represents) after each revolution of the rotary recording head. Thus, every channel within a single frame contains the same time code word 420. In the preferred embodiment, each revolution represents 960 audio samples. During normal playback, the read head decodes the time code information along with the other digital data recorded on the tape. Each frame recorded on the tape can be precisely located simply by specifying to the read system the time code word 420 of the desired tape location. Further, as the time code value is incremented from rotation to rotation, by an amount equal to the number of audio samples represented by each rotation, by inference each audio sample is associated with a unique time code value.

Additionally, because the same 32-bit time code word 420 is recorded 16 times for each frame, the digital audio system is able to locate a desired point on the tape even while operating in a high-speed "shuttle" mode. In the "shuttle" mode, the linear tape speed is increased while still maintaining contact between the rotary drum and the tape. The speed of the rotary drum is kept the same as during normal operation. In the preferred embodiment, the linear tape speed is four times faster in the "shuttle" mode than during normal playback.

In "shuttle" mode, the rotating heads do not read all of the digital information recorded on the tape because the rotating heads are scanning too slow to maintain immediate synchronization with the tape. However, using the tape format of the present invention, the rotary heads only need to detect one error-free time code word 420 out of the sixteen available time code words included in each frame 203 in order to maintain time code synchronization.

The time code word 420 is read from the tape and stored internally. The digital audio system automatically increments the time code word 420 after every revolution of the rotary drum and uses this automatically incremented value as a check when reading the time code word of the next frame. In the preferred embodiment, the time code word is incremented once by 960 audio samples every rotation. If the digital audio system is unable to read the time code information from the tape (possibly due to a media drop-out or an obstruction), the digital audio system increments by 960 the stored time code word after the next drum revolution and looks for the time code information in the subsequent frame. If the digital audio system is unable to detect any time code information on the tape after a certain number of drum revolutions (possibly because the tape is unformatted), the system generates an error. The user is notified of the system's inability to detect time code information, and is instructed to correct the problem (e.g., format the tape).

The audio sector 305 concludes with two more 320-bit sector guards 407. Each of these sector guards 407 is comprised of forty 8-bit sync words 406.

During formatting, sector spaces 306 are written to the tape. Each sector space 306 is comprised of forty sync words 406. When digital data is recorded onto the tape during non-format operation, the write head does not write to the sector spaces 306. Instead, each sector space 306 acts as a boundary between neighboring audio sectors 305. The sector space 306 helps prevent head misalignment errors that may occur during over-dubbing. For example, when punching in and out of a single channel of digital audio, the sector spaces 306 help prevent neighboring channels from being written over if the recording head is not perfectly aligned with the tape. Also, sometimes there exists some slight head misalignment between recording devices. This misalignment may place neighboring sectors in danger of being overwritten or erased. The sector spaces 306 of the present invention allow some freedom in the operation of the write head and protect the recorded data from inadvertent alterations.

Figure 4I:
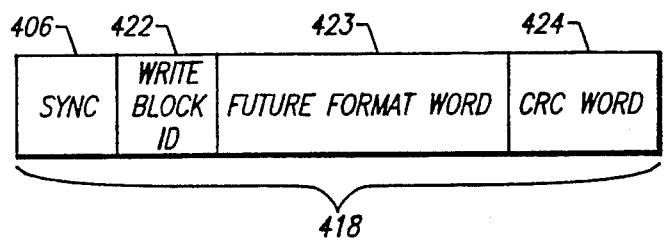

At the end of the second track of each frame, but before the track exit 307, is a write timing sector 308. The write timing sector 308 is comprised of two sector guards 407 and a write timing block 418. As illustrated in FIG. 4(I), the write timing block 418 consists of an 8-bit sync word 406, an 8-bit write timing block ID 422, a 32-bit future format word 423, and a 32-bit CRC word 426. The lower 5 bits of the write timing block ID 422 are set equal to 31 to identify it as the write timing block 418 and not digital audio data. The upper 3 bits of the write timing block ID 422 are set equal to zero. When the tape is formatted for the first time, the write timing sector 308 is placed at the end of every other track on the tape. The write timing sector 308 is a location marker with known relative position to all other data on the track. By reading the write timing sector 308, the digital system can predict the exact location of the beginning of the next frame prior to writing new data to that frame. The write timing sector 308 is used during write operations to give a point in time reference that allows the system to determine exactly where a desired sector is located on the tape. This allows interchangeability between digital audio recording machines. The 32-bit future format word 423, although not required in the preferred embodiment, may represent control information, formatting information, or other information useful in a digital audio environment.

The write timing sector 308 serves as a reference for resetting the write counter at the end of each track pair. This provides the system with precise information concerning how the tape is recorded. Often the read and write heads of different digital audio recorders are not identically aligned in reference to the tape, leading to poor tracking when a tape recorded on one machine is over-recorded on another machine. The write timing sector 308 provides a signpost for the write counter for signalling the end of each track pair and resetting the write control system before the beginning of the next track pair on the tape. In this way, the relative tape to head drum position can be determined by the logic of the machine so that individual audio channel sectors may be over-recorded without disturbing other adjacent sectors.

Each track is concluded with a track exit 307 comprised of 554 sync words 406, as shown in FIG. 4(D). In the preferred embodiment, an entire track is thus composed of 110,304 bits that are modulated, using the 8–10 channel coding scheme, into 137,880 channel clocks. Since there are 2 tracks (one frame) for every revolution of the rotary drum, each revolution yields 275,760 channel clocks. In the preferred embodiment, the rotary drum revolves at 50 revolution/second, producing a channel clock rate of 13.788 MHz.

The tape format of the present invention allows multi-channel digital audio information to be easily recorded on one-half inch tape, maintaining a low bit density rate and permitting accurate and repeatable single channel electronic editing.

Figure 5B:
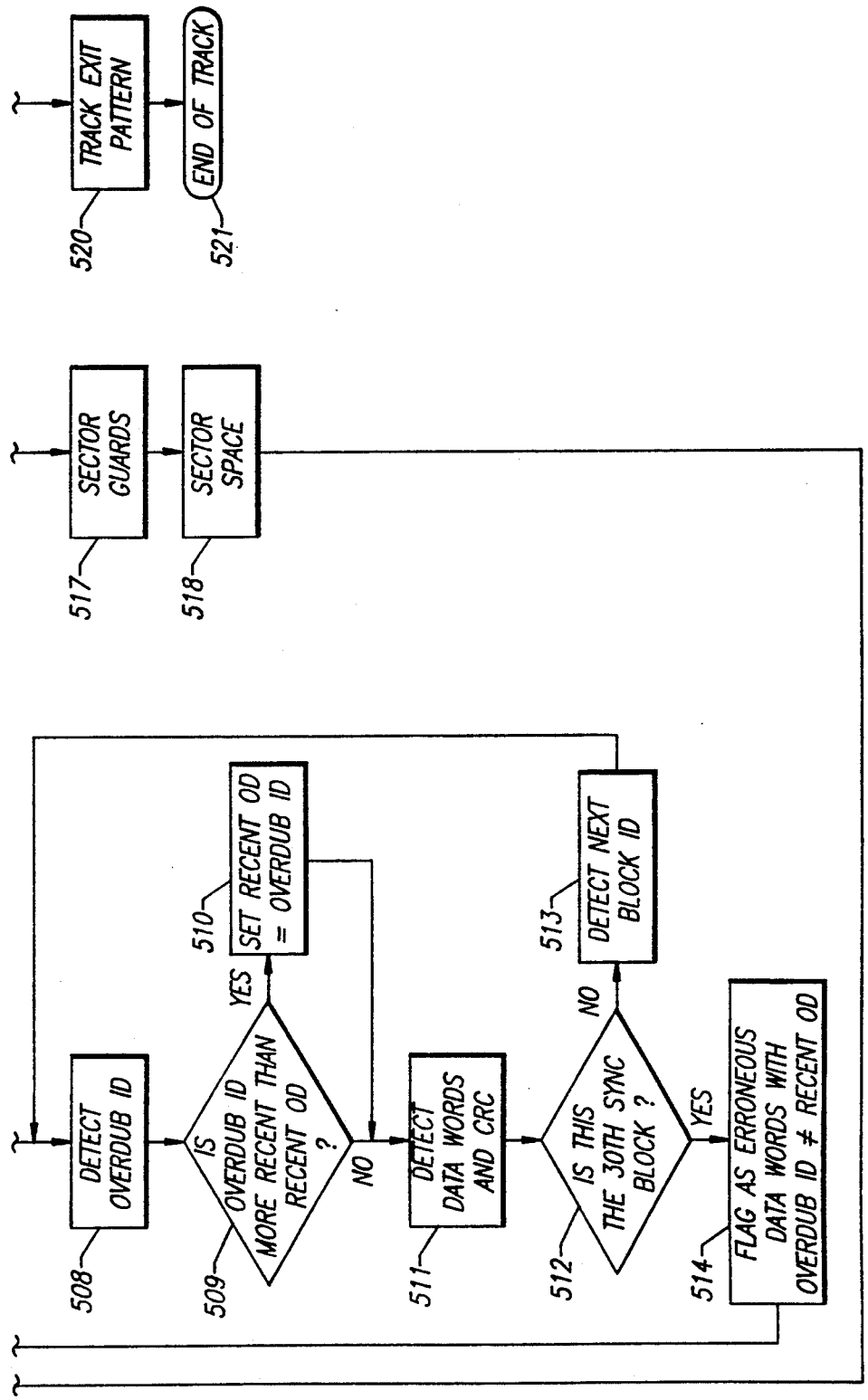

FIG. 5 is a flowchart illustrating the control flow that occurs during the reading of a single track of the preferred embodiment. At step 501, the track begins, and at step 502, the track intro 304 is read. At step 503, sector guards 407 are read. At step 504, sync word 406 is detected. At step 505, a block ID is detected and the question is asked at decision block 506, "Is Block ID=Audio sync block?" If the answer is yes, then the block ID detected is sync block ID 414, and control proceeds to step 507, where the variable RECENTOD is initialized. At step 508, the overdub ID 415 is detected.

At decision block 509, the question is asked, "Is Overdub ID more recent than RECENTOD?" if the answer is no, control proceeds to step 511. If the answer is yes, RECENTOD is set equal to the overdub ID 415 at step 510, and control proceeds to step 511. At step 511, data words 416 and CRC word 417 are detected. At decision block 512, the question is posed, "Is this the 30th sync block?" If the answer is no, then at step 513 the next block ID is detected, and control proceeds to step 508. If the answer to the question posed at block 512 is no, then at step 514, data words with overdub ID's not equal to RECENTOD are flagged as erroneous, and control proceeds to step 505.

If the answer to the question posed at decision block 506 is no, then the question is asked at decision block 515, "Is Block ID=Time Code block?" If the answer to this question is yes, the time code word 420 and CRC word 421 are detected at step 516. At step 517, the sector guards 407 are read, at step 518, sector space 410 is read, and control proceeds to step 503.

If the answer to the question posed at decision block 515 is no, then the block ID must indicate a write sector block, and the future format word 423 and CRC word 424 are detected at step 519. The track exit 307 is read at step 520, and the end of the track is encountered at step 521.

Figure 6A:
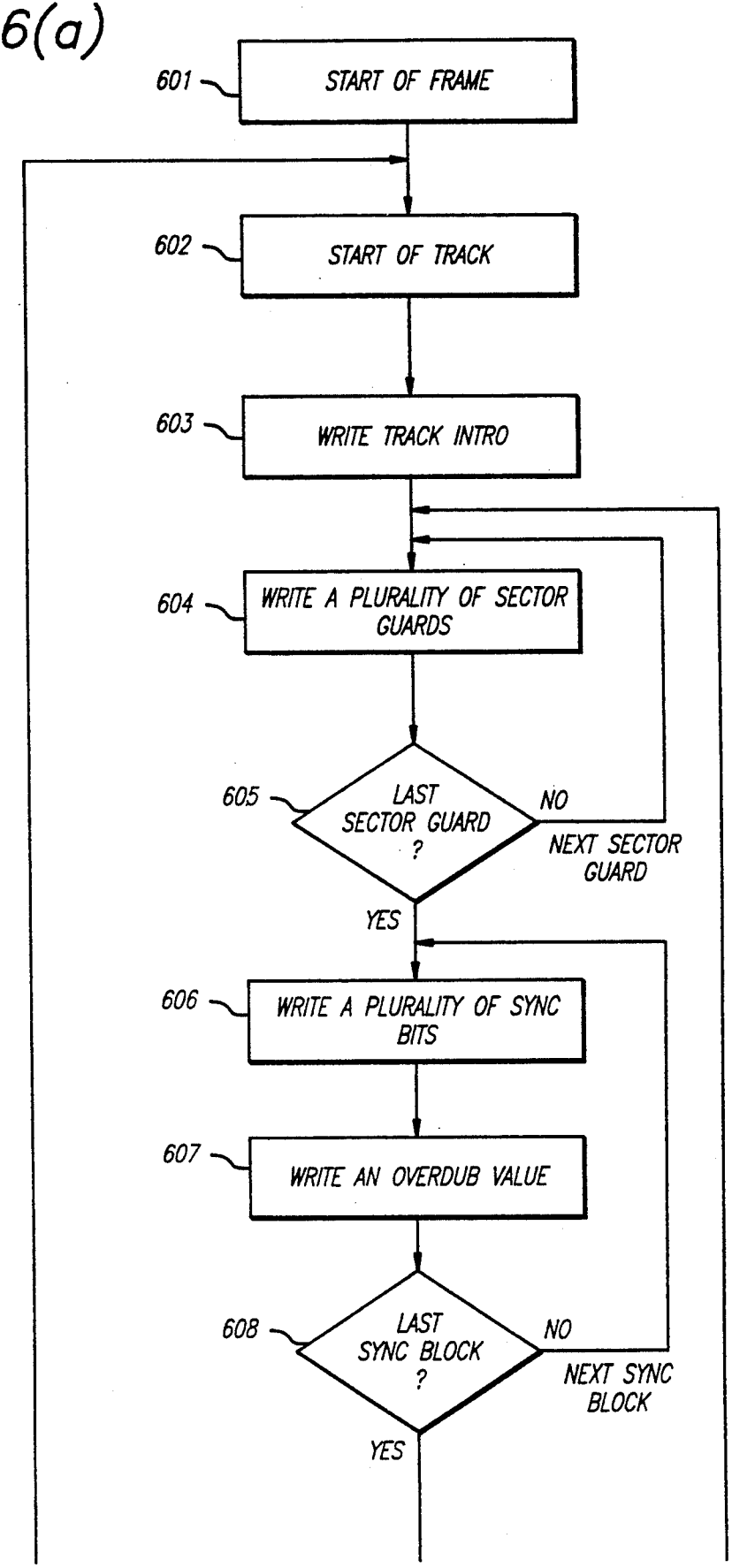
FIG. 6(a)–6(b) is a flow diagram illustrating the writing of a frame.
Figure 6B:
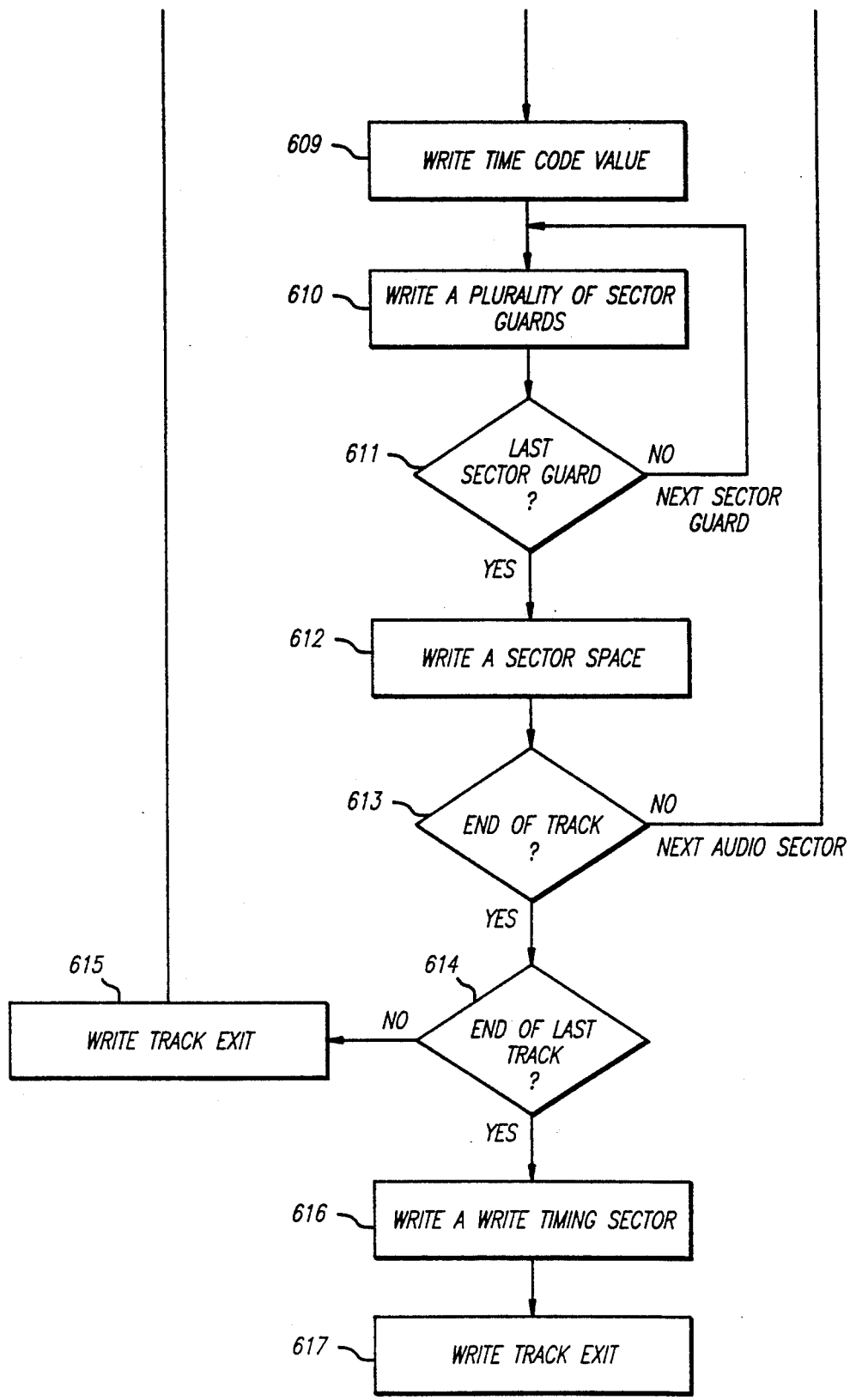

A flow diagram illustrating the writing of a frame is illustrated in FIG. 6. A frame begins at step 601. At step 602, a track begins. At step 603, a track intro is written. At step 604 a plurality of sector guards are written. At decision block 605 the argument "last sector guard?" is made. If the argument is false, the system returns to step 604 and writes another sector guard. If the argument at decision block 605 is true, the system proceeds to step 606.

At step 606, a plurality of sync bits are written. After each plurality of sync bits, an overdub value is written at step 607. Each plurality of sync bits with its associated overdub value is a "sync block". At decision block 608 the argument "last sync block?" is made. If the argument is false, the system returns to steps 606 and 607 and writes another sync block. If the argument at decision block 608 is true, the system proceeds to step 609.

At step 609, a time code value is written. A plurality of sector guards are written at step 610. At decision block 611 the argument "last sector guard?" is made. If the argument is false, the system returns to step 610 and writes another sector guard. If the argument at decision block 611 is true, the system proceeds to write a sector space at block 612. The system then proceeds to decision block 613.

At decision block 613 the argument "end of track?" is made. If the argument is false, the system returns to step 604. If the argument at decision block 613 is true, the system proceeds to decision block 614. At decision block 614 the argument "end of last track?" is made. If the argument is false, the system proceeds to step 615 and a track exit is written. The system then returns to step 602. If the argument at decision block 614 is true, the system proceeds to step 616 and a write timing sector is written. At step 617 a track exit is written. Step 618 indicates the end of a frame.

Thus, a tape format for recording multiple channels of 16-bit digital audio information onto one-half inch tape using a rotary magnetic head is described.

We claim:

1. A recording format for digital information comprising:
   a plurality of tracks on a storage medium, each track beginning with a first plurality of synchronizing patterns and terminating with a second plurality of synchronizing patterns;
   each of said tracks comprised of a plurality of consecutive audio sectors, each of said audio sectors separated from a neighboring audio sector by a sector space, each audio sector comprising a plurality of digital audio samples, a time code value, and a plurality of sector guards, said sector guards beginning and terminating each audio sector;
   each of said audio samples comprising a plurality of data words, error detection and correction redundancies, and an overdub value; and
   on every other track, a write timing marker, said write timing marker positioned after said plurality of audio sectors but before said second plurality of synchronizing patterns terminating said track.

2. The format of claim 1 wherein said synchronizing pattern is comprised of an N-bit binary word (N an integer >2).

3. The format of claim 2 wherein said N-bit binary word is comprised of (N−1) consecutive binary bits of one polarity terminated with a single bit of the opposite polarity.

4. The format of claim 3 wherein N=10 and said 10-bit binary word is "1111111110."

5. The format of claim 1 wherein said time code value increases by M, where M is a positive real number, at intervals corresponding to a revolution of a rotary magnetic recording head.

6. The format of claim 5 wherein M is equal to the number of digital audio samples recorded onto said storage medium during a single revolution of said rotary head.

7. A method of forming a digital format pattern on a storage media for use by a digital recording system, comprising the steps of:
   forming a plurality of diagonal tracks on said storage media using a rotary magnetic head, each diagonal track beginning and terminating with a plurality of synchronizing patterns that allow said digital recording system to adjust its read circuitry accordingly;
   including with each said diagonal track a plurality of consecutive audio sectors, each audio sector separated by a sector space, each audio sector comprising a plurality of digital sync blocks;
   including within each of said audio sectors a time code value, said time code value serving as a storage media location marker for said digital recording system, said time code value incremented by said digital recording system upon each revolution of said rotary magnetic head;

including within each of said digital sync blocks an overdub value, said overdub value for determining the most recent digital format pattern recorded on said storage media, said overdub value incremented by said digital recording system each time said rotary magnetic head records a digital format pattern onto said storage media;

including at the end of one of said plurality of diagonal tracks a write timing sector, said write timing sector serving as an absolute position marker for allowing said digital recording system to determine the spatial relationship between said plurality of diagonal tracks and said rotary magnetic head.

8. The method of claim 7 wherein said synchronizing pattern is comprised of an N-bit binary word (N an integer>2).

9. The method of claim 8 wherein said N-bit binary word is comprised of (N−1) consecutive binary bits of one polarity terminated with a single bit of the opposite polarity.

10. The method of claim 9 wherein N=10 and said 10-bit binary word is "1111111110."

11. The method of claim 7 wherein said time code value increases by M, where M is a positive real number, at intervals corresponding to a revolution of a rotary magnetic recording head.

12. The format of claim 11 wherein M is equal to the number of digital audio samples recorded onto said storage medium during a single revolution of said rotary head.

* * * * *